(12) United States Patent
Malaescu et al.

(10) Patent No.: US 11,195,056 B2
(45) Date of Patent: Dec. 7, 2021

(54) SYSTEM IMPROVEMENT FOR DEEP NEURAL NETWORKS

(71) Applicant: FotoNation Limited, Galway (IE)

(72) Inventors: Alexandru Malaescu, Bucharest (RO); Adrian Dorin Capata, Bucharest (RO); Mihai Ciuc, Bucharest (RO); Alina Sultana, Bucharest (RO); Dan Filip, Bucharest (RO); Liviu-Cristian Dutu, Bucharest (RO)

(73) Assignee: FotoNation Limited

( * ) Notice: Subject to any disclaimer, the term of this patent is extended or adjusted under 35 U.S.C. 154(b) by 43 days.

(21) Appl. No.: 16/816,893

(22) Filed: Mar. 12, 2020

(65) Prior Publication Data

US 2021/0089831 A1  Mar. 25, 2021

Related U.S. Application Data

(60) Provisional application No. 62/905,828, filed on Sep. 25, 2019.

(51) Int. Cl.
*G06K 9/62* (2006.01)
*G06N 3/08* (2006.01)
*G06N 3/04* (2006.01)

(52) U.S. Cl.
CPC ......... *G06K 9/6262* (2013.01); *G06K 9/6256* (2013.01); *G06N 3/04* (2013.01); *G06N 3/08* (2013.01)

(58) Field of Classification Search
CPC .. G06K 9/6262; G06K 9/6256; G06K 9/6271; G06N 3/08; G06N 3/04

USPC .......................................... 382/157
See application file for complete search history.

(56) References Cited

U.S. PATENT DOCUMENTS

| | | | |
|---|---|---|---|
| 9,177,550 B2* | 11/2015 | Yu | G06N 3/084 |
| 10,482,600 B2* | 11/2019 | Zhou | G16H 30/40 |
| 10,990,857 B2* | 4/2021 | Lim | G06N 3/0454 |
| 10,991,074 B2* | 4/2021 | Bousmalis | G06T 3/4084 |
| 2019/0066281 A1* | 2/2019 | Zheng | G06N 3/0454 |
| 2019/0205334 A1* | 7/2019 | Kim | G06T 1/20 |
| 2020/0151481 A1* | 5/2020 | Yoo | G06N 3/0472 |

(Continued)

OTHER PUBLICATIONS

Isola, Phillip, Jun-Yan Zhu, Tinghui Zhou, & Alexei A. Efros, "Image-to-Image Translation with Conditional Adversarial Nets" <https://phillipi.github.io/pix2pix/> University of California, Berkeley in CVPR 2017, last updated Oct. 20, 2019.

(Continued)

*Primary Examiner* — Juan A Torres
(74) *Attorney, Agent, or Firm* — Lerner, David, Littenberg, Krumholz & Mentlik, LLP

(57) ABSTRACT

The technology relates to tuning a data translation block (DTB) including a generator model and a discriminator model. One or more processors may be configured to receive training data including an image in a second domain. The image in the second domain may be transformed into a first domain with a generator model. The transformed image may be processed to determine one or more outputs with one or more deep neural networks (DNNs) trained to process data in the first domain. An original objective function for the DTB may be updated based on the one or more outputs. The generator and discriminator models may be trained to satisfy the updated objective function.

24 Claims, 8 Drawing Sheets

(56) References Cited

U.S. PATENT DOCUMENTS

| | | | | |
|---|---|---|---|---|
| 2020/0160113 | A1* | 5/2020 | Zhang | G06N 3/0454 |
| 2020/0327382 | A1* | 10/2020 | Otto | G06K 9/6273 |
| 2020/0364562 | A1* | 11/2020 | Khoreva | G06K 9/6256 |
| 2021/0012486 | A1* | 1/2021 | Huang | G06T 5/00 |

OTHER PUBLICATIONS

V. Melnicuk and S. Birrell and E. Crundall and P. Jennings, "Towards Hybrid Driver State Monitoring: Review, Future Perspectives and the Role of Consumer Electronics", IEEE Intelligent Vehicles Symposium (IV) 2016, pp. 1392-1397.

https://www.valeo.com/en/driver-monitoring/ retrieved on Jan. 10, 2020.

C. D. Katsis and Y. Goletsis and G. Rigas and D. I. Fotiadis, "A wearable system for the affective monitoring of car racing drivers during simulated conditions",—Transportation Research Part C: Emerging Technologies, 19(3), 2011, pp. 541-551.

Y. H. Lin and C. F. Lin and H. Z. You, "A driver's physiological monitoring system based on a wearable PPG sensor and a smartphone", 2nd Intl. Conf. on the Emerging Areas of Security-Enriched Urban Computing and Smart Grids, 2011, pp. 326-335, 2 pages.

https://globenewswire.com/news-release/2018/08/20/1553892/0/en/Driver-Monitoring-Systems-Market-Worth-Will-Be-US-20-070-6-Million-By-2026-Credence-Research.html, retrieved on Jan. 10, 2020.

https://cdn.euroncap.com/media/30700/euroncap-roadmap-2025-v4.pdf, retrieved on Jan. 15, 2020.

A. Krizhevsky and I. Sutskever and G. Hinton, "ImageNet Classification with Deep Convolutional Neural Networks", NIPS 2012, pp. 1106-1114.

A. Behera, A. Gidney, Z. Wharton, D Robinson, K. Quinn, "A CNN Model for Head Pose Recognition using Wholes and Regions", IEEE International Conference on Automatic Face & Gesture Recognition 2019, abstract.

G. Borghi, R. Gasparini, R. Vezzani, R. Cucchiara, "Embedded Recurrent Network for Head Pose Estimation in Car", IEEE Intelligent Vehicles Symposium, 2017.

S. Vora, A. Rangesh, M. M. Trivedi, "On Generalizing Driver Gaze Zone Estimation using Convolutional Neural Networks", IEEE Intelligent Vehicles Symposium, 2017, pp. 849-854.

M. Wang, W. Deng, "Deep Face Recognition: A Survey", arXiv preprint arXiv: 1804.06655, 2018.

A. Malaescu, L. C. Dutu, A. Sultana, D. Filip, M. Ciuc, "Improving in-car emotion classification by NIR database augmentation", IEEE International Conference on Automatic Face & Gesture Recognition 2019, abstract.

P. L. Suarez and A. D. Sappa and B. X. Vintimilla, "Infrared Image Colorization Based on a Triplet DCGAN Architecture", 2017 IEEE Conference on Computer Vision and Pattern Recognitionworkshops (CVPRW), 2017, pp. 212-217.

Y. Cao and Z. Zhou and W. Zhang and Y. Yu, "Unsupervised Diverse Colorization via Generative Adversarial Networks", Lecture Notes in Computer Science, vol. 10534, 2017.

Z. Cheng and Q. Yang and B. Sheng, "Deep Colorization", ICCV 2015, pp. 415-423.

J. Kim, J. K. Lee, K. M. Lee, "Accurate image super-resolution using very deep convolutional networks", CVPR 2016, pp. 1646-1654 [17] J. Y. Zhu and T. Park and P. Isola and A. A. Efros, "Unpaired image-to-image translation using cycle-consistent adversarial networks", ICCV 2017, pp. 2242-2251.

J. Kim, M. Kim, H. Kang, K. Lee, "U-GAT-IT: Unsupervised Generative Attentional Networks with Adaptive Layer-Instance Normalization for Image-to-lmage Translation", arXiv preprint arXiv: 1907.10830, 2019.

I. Goodfellow and J. Pouget-Abadie and M. Mirza and B. Xu and D. Warde-Farley and S. Ozair and A. Courville and Y. Bengio,"Generative adversarial nets", NIPS 2014.

M. Y. Liu, T. Breuel, J. Kautz, "Unsupervised image-to-image translation networks", NIPS 2017.

X. Huang, M. Y. Liu, S. Belongie, J. Kautz, "Multimodal unsupervised image-to-image translation", ECCV 2018, pp. 172-189.

H. Y. Lee, H. Y. Tseng, J. B. Huang, M. Singh, M. H. Yang, "Diverse image-to-image translation via disentangled Yepresentations", ECCV 2018, pp. 35-51.

J. Johnson and A. Alexandre and F. F. Li, "Perceptual losses for realtime style transfer and super-resolution", ECCV 2016, pp. 694-711.

K. Simonyan and A. Zisserman, "Very deep convolutional networks for large-scale image recognition", ICLR 2015.

R. Rosales, K. Achan, and B. J. Frey. "Unsupervised image translation." ICCV. 2003.

I. Goodfellow. "NIPS 2016 tutorial: Generative adversarial networks." arXiv preprint arXiv:1701.00160 (2016).

M. Mirza, and S. Osindero. "Conditional Generative Adversarial Nets." arXiv preprint arXiv:1411.1784 (2014).

Y. LeCun, C. Cortes, and C. J. C. Burges. "The MNIST database of handwritten digits, 1998." URL http://yann.lecun.com/exdb/mnist, Feb. 25, 2020.

P. Sangkloy, J. Lu, C. Fang, F. Yu, and J. Hays. "Scribbler: Controlling deep image synthesis with sketch and color." Proceedings of the IEEE Conference on Computer Vision and Pattern Recognition 2017.

I. Loshchilov, and F. Hutter. "SGDR: Stochastic gradient descent with warm restarts." arXiv preprint arXiv:1608.03983 (2016).

K. Diederik and J. Ba. "ADAM: A method for stochastic optimization." arXiv preprint arXiv: 1412.6980 (2014).

K. He, X. Zhang, S. Ren and J. Sun. "Deep residual learning for image recognition." Proceedings of the IEEE conference on computer vision and pattern recognition 2016.

J. Y. Zhu and T. Park and P. Isola and A. A. Efros, "Unpaired image-to-image translation using cycle-consistent adversarial networks", ICCV 2017, pp. 2242-2251.

Malaescu et al., "Task-Driven Image-to-Image Translation for Automotive Applications;" DTS Romania, member of Xperi Group; Jan. 23, 2020; 7 pages.

* cited by examiner

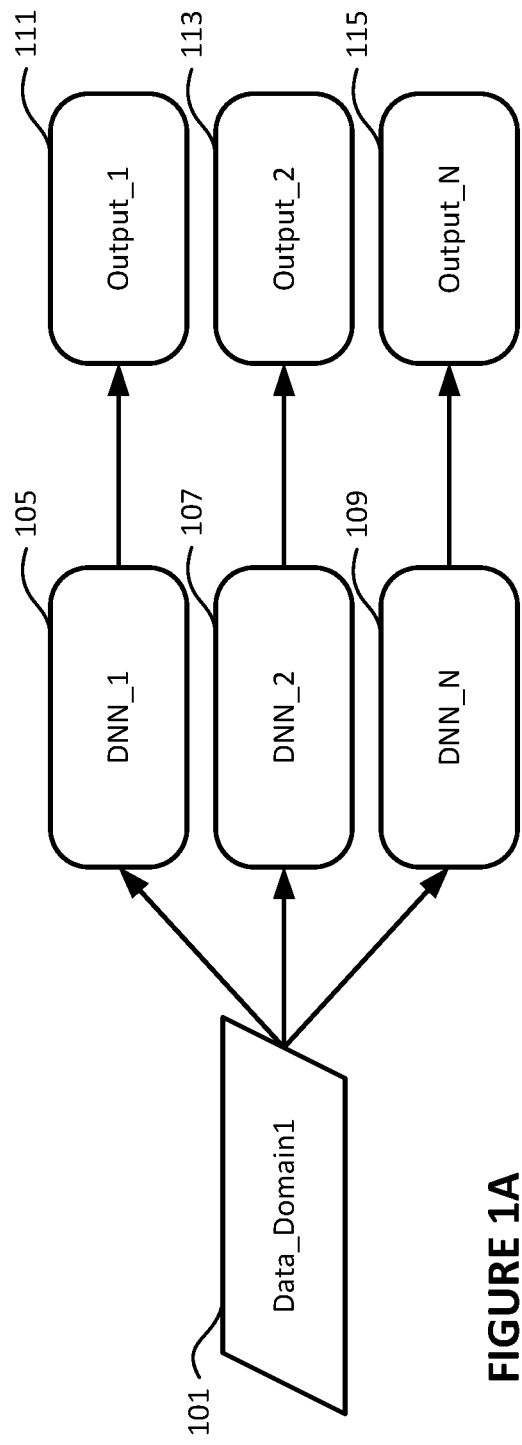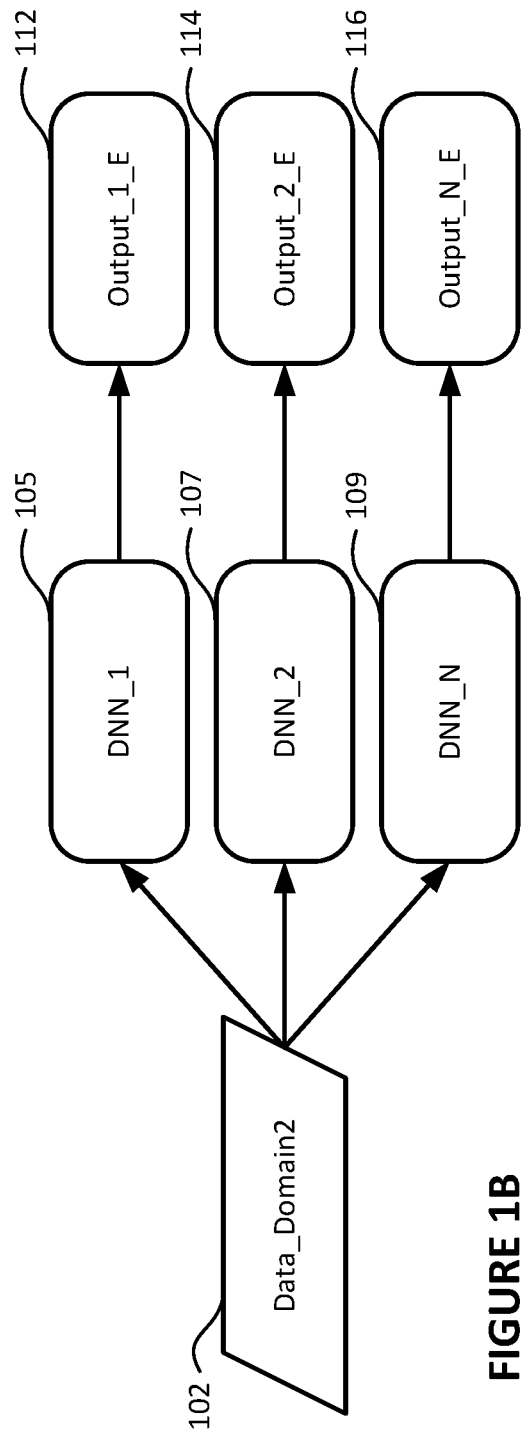

SYSTEM IMPROVEMENT FOR DEEP NEURAL NETWORKS

CROSS-REFERENCE TO RELATED APPLICATION

The present application claims the benefit of the filing date of U.S. Provisional Patent Application No. 62/905,828 filed Sep. 25, 2019, the disclosure of which is hereby incorporated herein by reference.

BACKGROUND

Deep neural networks (DNNs) are typically trained using training data belonging to particular domains. The training data may include a large collection of data belonging to the same domain that which the DNNs will be tasked with processing after training. In order to effectively train the DNNs, some, if not all of the training data is labeled and reviewed for accuracy. Much of the labeling is done manually and typically requires a significant time commitment. Depending on the size of the training data and complexity of the DNNs, the training of the DNNs may be costly in terms of the amount of computing resources and time required. Moreover, the performance of the DNNs during training may need to be manually reviewed for accuracy, which requires additional resources. Once trained, the DNNs may accurately process data that falls within the particular domain for which it was trained.

When DNNs are tasked with processing data that falls outside of the particular domain for which it was trained, the DNNs may not be able to process the data or the performance of the DNNs may decrease. As a result, new training data may need to be acquired and labelled, and new DNNs may need to be trained on the new training data. In instances where the DNNs are implemented in hardware, retraining or creating new DNNs may not be possible.

BRIEF SUMMARY

One aspect of the disclosure provides a method for tuning a data translation block (DTB) including a generator model and a discriminator model. The method may include receiving, by one or more processors, training data including an image in a second domain. A generator model executing on the one or more processors may transform the image from the second domain to a transformed image in a first domain. One or more deep neural networks (DNNs) trained to process data in the first domain and executing on the one or more processors, may process the transformed image to determine one or more outputs. An original objective function for the DTB may be updated based on the one or more outputs. The generator model and discriminator model may be trained to satisfy the updated objective function.

In some instances each of the one or more DNNs outputs a respective output of the one or more outputs, and each respective output includes one or more predictions or estimated values.

In some examples the training data further includes markings associated with the image in the second domain, the markings associated with the image in the second domain being separated into subsets, with each subset of markings being assigned to the one or more DNNs.

In some examples, the method may further include calculating a loss value for each of the one or more outputs. The loss value (Loss) may be calculated for each DNN, using the formula $Loss_i=(M_{D2-i}-M_{\sim D2-i})^2$, where i is the DNN index, where $M_{D2-i}$ is the subset of markings assigned to DNNi and $M_{\sim D2-i}$ is the one or more predictions or estimated values output by DNNi.

In some instances, the method may further include aggregating the loss value for each of the one or more DNNs and determining the average loss value (DNN_AVG_LOSS).

In some examples, the updated objective function is: $O_{CGAN}+\alpha_{DNN\_AVG\_LOSS}*DNN\_AVG\_LOSS$, where $O_{CGAN}$ is the original objective function of the DTB and $\alpha_{DNN\_AVG\_LOSS}$ is a weight factor.

In some implementations, the training data further includes a training image in the second domain, and the discriminator is trained to satisfy the updated objective function based on the transformed image and the training image.

Another aspect of the disclosure provides a non-transitory computer-readable medium storing instructions, which when executed by one or more processors, cause the one or more processors to receive training data including an image in a second domain; transform the image from the second domain to a transformed image in a first domain with a generator model; process the transformed image to determine one or more outputs with one or more deep neural networks (DNNs) trained to process data in the first domain; update an original objective function for a DTB based on the one or more outputs; and train the generator model and discriminator model to satisfy the updated objective function.

In some examples of the non-transitory computer-readable medium, each of the one or more DNNs outputs a respective output of the one or more outputs, and each respective output includes one or more predictions or estimated values. In some examples, the training data further includes markings associated with the image in the second domain, the markings associated with the image in the second domain being separated into subsets, with each subset of markings being assigned to the one or more DNNs.

In some examples, the instructions further cause the one or more processors to calculate a loss value for each of the one or more outputs. In some instances, the loss value ($Loss_i$) is calculated for each DNN, using the formula: $Loss_i=(M_{D2-i}-M_{\sim D2-i})^2$, where i is the DNN index, where $M_{D2-i}$ is the subset of markings assigned to DNNi and $M_{\sim D2-i}$ is the one or more predictions or estimated values output by DNNi.

In some examples, the instructions further cause the one or more processors to aggregate the loss value for each of the one or more DNNs, and determine an average loss value (DNN_AVG_LOSS).

In some instances, the updated objective function is $O_{CGAN}+\alpha_{DNN\_AVG\_LOSS}*DNN\_AVG\_LOSS$, where $O_{CGAN}$ is the original objective function of the DTB and $\alpha_{DNN\_AVG\_LOSS}$ is a weight factor.

In some examples of the non-transitory computer-readable medium, the training data further includes a training image in the second domain, and the discriminator is trained to satisfy the updated objective function based on the transformed image and the training image.

Another aspect of the disclosure provides a system for tuning a data translation block (DTB) including a generator model and a discriminator model. The system may include the system including: one or more computing devices having one or more processors; and memory storing instructions, the instructions, when executed by the one or more processors, cause the one or more processors to: receive training data including an image in a second domain; transform the image from the second domain to a transformed image in a first domain with a generator model; process the transformed image to determine one or more outputs with one or more deep neural networks (DNNs) trained to process data in the first domain; update an original objective function for the DTB based on the one or more outputs; and train the generator model and discriminator model to satisfy the updated objective function.

In some examples of the system, each of the one or more DNNs outputs a respective output of the one or more outputs, and each respective output includes one or more predictions or estimated values.

In some examples, the training data further includes markings associated with the image in the second domain, the markings associated with the image in the second domain being separated into subsets, with each subset of markings being assigned to the one or more DNNs. In some instances, the instructions further cause the one or more processors to: calculate a loss value for each of the one or more outputs.

BRIEF DESCRIPTION OF THE DRAWINGS

The present technology is illustrated by way of example, and not by way of limitation, in the figures of the accompanying drawings in which like reference numerals refer to similar elements including:

FIG. 1A is an example illustration of DNNs processing data in a domain for which the DNNs were trained in accordance with aspects of the disclosure.

FIG. 1B is an example illustration of DNNs processing data in a domain for which the DNNs were not trained in accordance with aspects of the disclosure.

DETAILED DESCRIPTION

Figure 2:
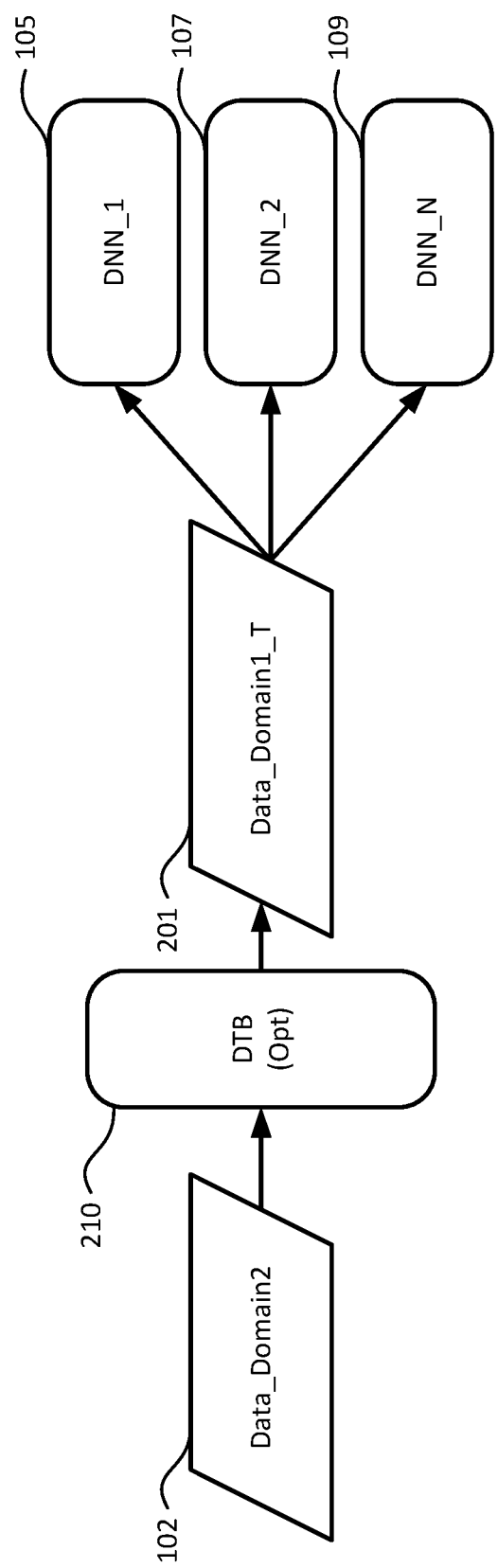
FIG. 2 is an example illustration of a domain translation block transferring data from one domain to another in accordance with aspects of the disclosure.

The technology generally relates to optimizing or otherwise tuning a domain transfer block (DTB) that transforms data from one domain into another domain on which DNNs were trained, while taking into consideration of the DNNs ability to effectively process the transformed data. By doing so, the DNNs can effectively process transformed data that originates from domains on which the DNNs were not trained. Accordingly, retraining of the DNNs and/or creation of new DNNs may be avoided.

As used herein, a data domain may correspond to a collection of data that is grouped together based on one or more shared traits. In this regard, a data domain may include a wide variety of data, a small variety of data, or a single type of data that satisfies the traits used to define the data domain. Data traits may include data type, the source of the data, the owner of the data, the size of the data, etc. Accordingly, a data domain may allow for many types of data or allow for only a single type of data. For example, a first data domain may be defined as a collection of images captured by a near infrared camera and a second data domain may be defined as a collection of images captured by a visible light camera. In another example, images captured by any type of camera may be considered a third data domain. Although the foregoing examples describe image data generated by cameras, other data may be used. For example, the first data domain may be audio data captured from a first microphone and the second data domain may be audio data captured from a second microphone. In another example, the first data domain may be audio data captured from a first location relative to a source and the second data domain may be audio data captured from a second location relative to a source.

FIG. 1A shows an example of a set of deep neural networks DNN_1, DNN_2, and DNN_N, shown as blocks 105-109, respectively, processing a data set 101 corresponding to a data domain—Data_Domain1. The DNNs 105-109 in the example shown in FIG. 1A were trained to process data in the same domain as the data in data set 101. For each piece of data in the data set 101, the DNNs 105-109 may provide outputs, including Output_1, Output_2, and Output_N, shown as blocks 111, 113, and 115, respectively. Although FIG. 1A, and the other examples and figures described herein, show only three DNNs, there may be any number of DNNs, each capable of providing a unique output.

For purposes of illustration only, Data_Domain1 may correspond to images of human faces captured by a near infrared camera and each DNN 105-109 may be trained to predict or estimate characteristic features of the faces in the images in data set 101. For instance, DNN_1 105 may be trained to predict the gender of each person in the images in data set 101, DNN_2 107 may be trained to predict the facial expression of each person in the images in data set 101, and DNN_N 109 may be trained to predict the individual in each of the images in data set 101.

FIG. 1B shows an example of the set of DNNs 105-109 providing outputs with less accuracy and/or errors when attempting to process data from a domain on which they were not trained. In this regard, FIG. 1B shows the set of DNNs 105-109 processing data from data set 102. The data in data set 102 corresponds to another domain—Data_Domain2—for which the DNNs 105-109 were not trained. Continuing the example from FIG. 1A, Data_Domain2 may correspond to images of human faces captured by a visible light camera. When DNN_1 105 attempts to determine predictions or estimations used for the detection of the gender of each person in the images in data set 102, the outputted predictions or estimations—Output_1_E 112— may be incorrect or inaccurate. Similarly, Output_2_E 114 and Output_N_E 116, corresponding to predictions or estimations determined by DNN_2 107 and DNN_N 109 to identify the facial expressions and the individuals, respectively, may also be incorrect or inaccurate. The potential error components are represented by the appended "E" in each of outputs 112-116. Although FIG. 1B shows the DNNs 105-109 generating an output, in some instances the DNNs may be unable to determine any output when processing data corresponding to a domain on which they were not trained.

An optimized domain transfer block (ODTB) may be used to transform a data set from a domain for which DNNs were not trained into another domain on which the DNNs were trained. FIG. 2 illustrates an example of an ODTB 210 transforming a data set 102 which includes data in Data_Domain2, for which DNNs 105-109 were not trained, into a data set 201 in Data_Domain1_T, for which DNNs 105-109 were trained to process. Although the transformed data in Data_Domain1_T may be indistinguishable to data in Data_Domain1 as determined by a data transform block, for clarity a "T" is appended onto the domain name to differentiate between domains of the transformed and non-transformed data sets.

A typical data transform block (DTB) may be implemented by generative adversarial networks (GANs). GANs are neural networks trained to produce data corresponding to a given statistical distribution. GANs are implemented using two models—a generator model that is trained to produce output data that matches or closely resembles the given statistical distribution and a discriminator model that is configured to distinguish between the data created by the generator model and actual data in a domain. The generator model may receive as input a random noise vector and the given statistical distribution and produce an output. The discriminator model may receive actual data used to form the given statistical distribution and output generated by the generator model. Based on the data input into the discriminator model, the discriminator model may classify the output generated by the generator model as real or fake. The determination of the discriminator model may be fed back into the generator model so that the generator model can adjust to attempt to more consistently cause the discriminator model to fail at detecting output generated by the generator model.

The generator model and discriminator model may be trained using antagonistic loss functions, such that training the GAN may be done by converging the loss functions of the generator and discriminator modules. The convergence of the loss function may continue until they reach so-called Nash equilibrium. At Nash equilibrium, the discriminator model may no longer be capable of consistently telling the difference between the actual data and the data created by the generator model.

In a Conditional GAN (CGAN), the discriminator and generator models may be conditioned with one or more label parameters to focus the output of the generator model on one or more characteristic features. For instance, a CGAN may include label parameters including parts of an image or an entire image to condition the generation process of the generator model to produce similar images to those included in the label parameters. While CGANs can be trained using paired datasets, such as in pix2pix, this kind of requirement is hard to meet in practice. This is why CGANs are often trained using unpaired datasets. Two common CGANs, trained using unpaired datasets, are CycleGAN and CoupledGAN. Both CycleGAN and CoupledGAN are extensions of the basic GAN framework.

DTBs implemented using CGANs, such as CycleGAN or CoupledGAN, may transform data from one domain to another. However, these DTBs do not take into account the ability of DNNs, such as DNNs 105-109, to subsequently process the transformed data. In this regard, the performance of these DTBs is typically measured only by the subjectively assessed quality of the transformed data by a discriminator, such as a human evaluator, without consideration of the ability for additional processing of the transformed data by DNNs. As previously described, DNNs are trained to process data in a particular domain. Although the transformed data may be in the domain on which the DNNs were trained, the transformed data may still have differences from the data on which the DNNs were trained. Accordingly, the DNNs may not process data in the transformed domain as efficiently and accurately as data from the original domain on which the DNNs were trained.

As detailed herein, DTBs can be trained to take into account the ability of DNNs to process data transformed from one domain into another domain. To do so, the objective function of the DTB block may be modified to incorporate the average loss of the DNNs as described herein. The training of an optimized DTB (ODTB), such as ODTB 210, may be performed in two stages, a training stage, where the ODTB 210 is trained by satisfying the modified objective function and a testing stage where the best performing model is determined.

DTBs may be used to transform image data from one domain to another domain, commonly referred to as image-to-image (121) translation. As previously mentioned, domains may be defined by image type. 121 translation systems can be roughly divided into two main categories including paired and unpaired. 121 translation systems in the paired category attempt to translate input images in one domain to output images in another domain, such that respective input and output images are pixel-aligned. Common tasks performed by paired 121 translation systems included colorization, super-resolution, or sketch-to-photo translations. 121 translation systems in the unpaired category may not have a constraint of pixel-level correspondence, which may allow for style transformations, such as photo-to-painting, summer-to-winter, cat-to-dog, selfie-to-anime type style transformations.

Figure 3A:
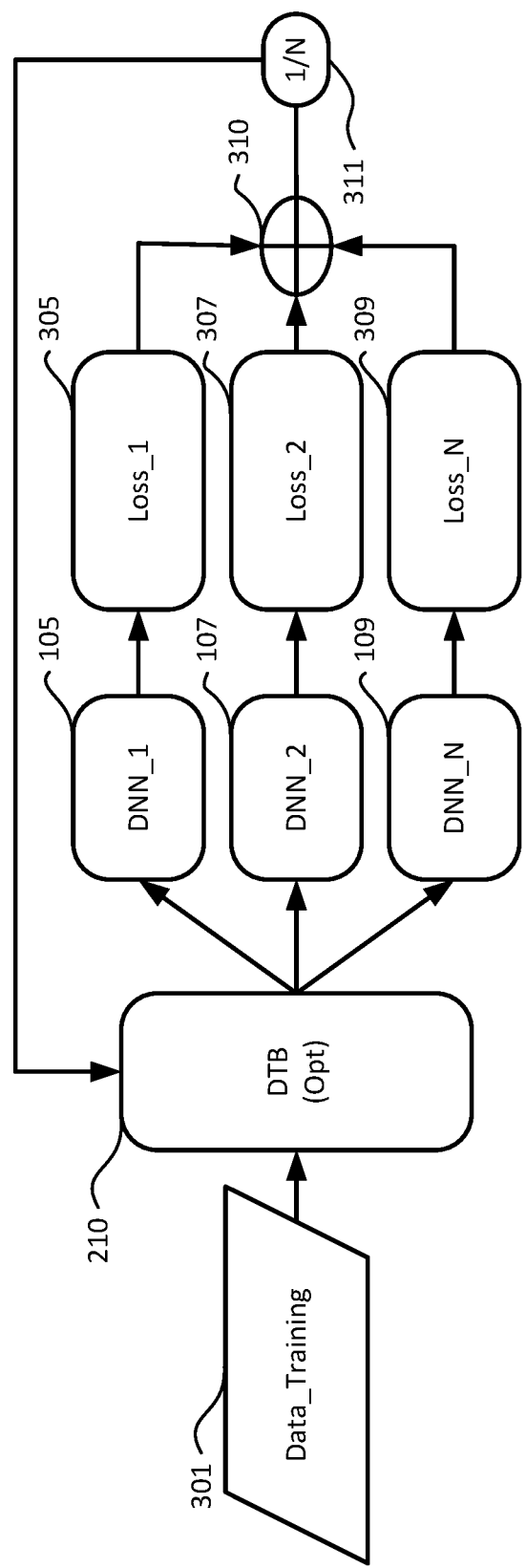
FIGS. 3A and 3B are example illustrations of training a domain translation block in accordance with aspects of the disclosure.

FIG. 3A illustrates a high level flow diagram of the training stage of optimized domain transfer block (ODTB) 210, implemented on an unpaired CGAN framework, using training data 301. The ODTB 210 may transform the training data from one domain to another domain, for which the DNNs 105-109 were trained and subsequently pass the transformed data to the DNNs. Each DNN 105-109 may process the transformed data and produce an output, such as a set of predictions or estimations. The act of processing data by the DNNs may be referred to as a task. For each task performed by the DNNs 105-109, a loss may be determined, as shown by blocks 305-309. The losses for the tasks may be aggregated, as shown in block 310, and averaged, as shown in block 311. The average loss may then be passed back to the ODTB 210 for use in conditioning the ODTB 210, as described herein.

The objective function to be satisfied during training of the ODTB 210 is shown in Formula 1:

$$O_{funct} = O_{CGAN} + \alpha_{DNN\_AVG\_LOSS} * DNN\_AVG\_LOSS \quad \text{Formula 1:}$$

where $O_{CGAN}$ is the original objective function of the CGAN without consideration of the performance of the DNNs, DNN_AVG_LOSS is the average loss for all DNN tasks, and $\alpha_{DNN\_AVG\_LOSS}$ is a weight factor of the DNN_AVG_LOSS.

Figure 3B:
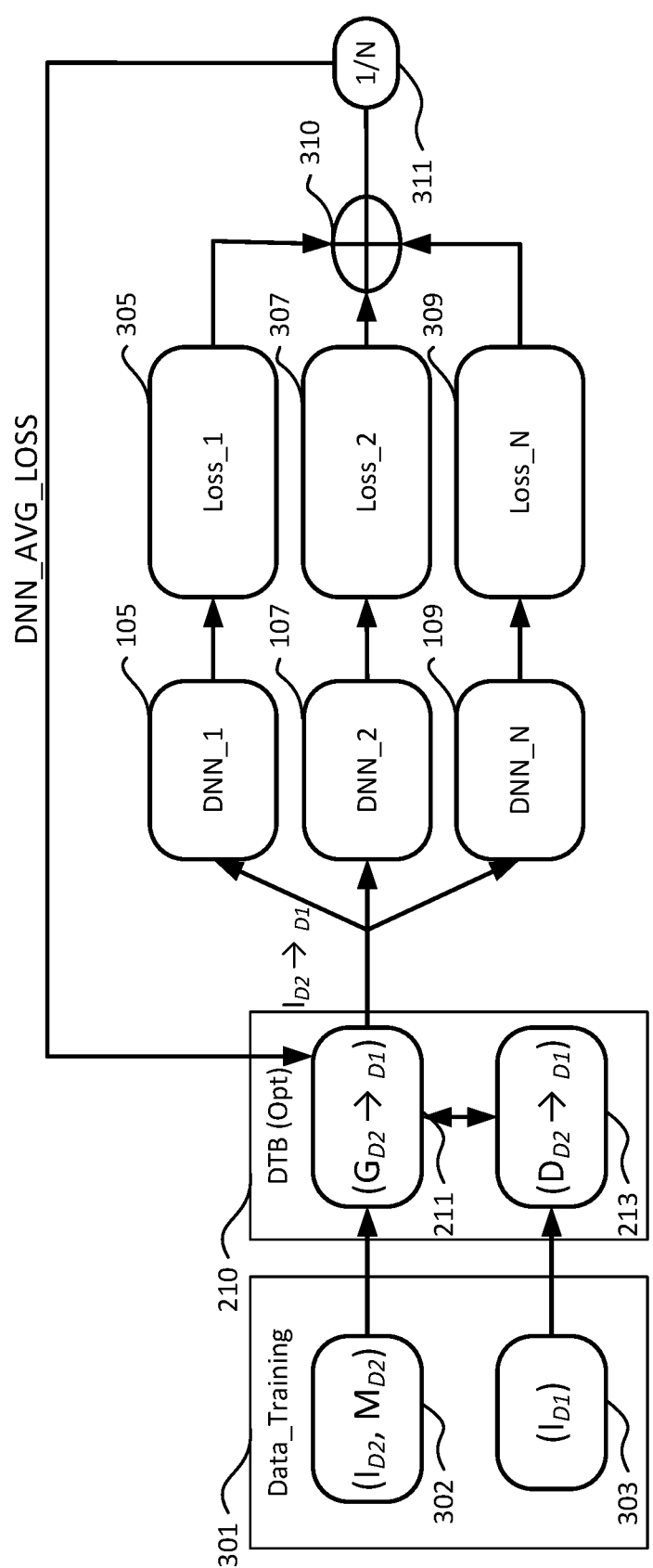

As shown in FIG. 3B, the training dataset may include two distinct data sets, 302 and 303. The first data set 302 may include data ($I_{D2}$, $M_{D2}$), where $I_{D2}$ represents a piece of data in the domain D2 and $M_{D2}$ represents a marking array for the piece of data $I_{D2}$ corresponding to the DNNs 105-109. That is, $M_{D2}=[M_{D2-1}, M_{D2-2} \ldots M_{D2-N}]$, where $M_{D2-1}$ is the markings for DNN_1 105, $M_{D2-2}$ is the markings for DNN_2 107, and $M_{D2-N}$ is the markings for DNN_N 109. The markings may be manually marked or marked by a model. Markings may be considered "ground-truths" corresponding to a given piece of data. For instance, $M_{D2-1}$ may be an identified gender of a person in the image $I_{D2}$.

As further shown in FIG. 3B, the second data set 303 may include data $I_{D1}$, where $I_{D1}$ represents a piece of data in domain D1, domain D1 being the domain in which the DNNs 105-109 were trained and the domain to which the piece of data $I_{D2}$, in domain D2, is to be transformed. Although FIG. 3B shows only a single piece of data in domain D2 "$I_{D2}$" and a single piece of data in domain D1 "$I_{D1}$", each data set, 302 and 303, may include any number of data pieces. Additionally data set 302 may include markings for each piece of data "$I_{D2}$".

As further shown in FIG. 3B, data, including data ($I_{D2}$, $M_{D2}$) in data set 302 may be passed to the generator model ($G_{D2 \rightarrow D1}$) 211 and data, including data $I_{D1}$ in data set 303 may be passed to the discriminator model ($D_{D2 \rightarrow D1}$) 213. The generator model 211 may also receive DNN_AVG_LOSS as an input, described herein.

The output of the ODTB 210, which is data $I_{D2}$ transformed from domain D2 to domain D1, labeled as $I_{D2 \rightarrow D1}$ in FIG. 3B, may be passed to each DNN 105-109. Upon completing their task on $I_{D2 \rightarrow D1}$, the loss of each DNN may be determined, as shown in blocks 305-309. In this regard, the loss for each DNN may be calculated using Formula 2:

$$\text{Loss}_i = L(M_{D2-i}, M_{\sim D2-i}) \quad \text{Formula 2:}$$

where i is the DNN index, $\text{Loss}_i$ is the loss of the DNN performing the task based on $M_{D2-i}$, $M_{D2-i}$ represents the markings for the piece of data $I_{D2}$ associated with the DNN performing the task, and $M_{\sim D2-i}$ is the prediction or estimated value determined by the DNN performing the task given input image $I_{D2 \rightarrow D1}$ and corresponding to ground-truth marking $M_{D2-i}$. For example, for i=1, DNN_1 105 may process $I_{D2-1}$ based on $M_{D2-1}$ and the prediction or estimated value determined by DNN_1 105 performing the task is $M_{\sim D2-1}$. For i=2, DNN_2 107 may process $I_{D2-2}$ based on $M_{D2-2}$ and the prediction or estimated value determined by DNN_2 107 performing the task is $M_{\sim D2-2}$. This process may occur for all DNNs through DNN_N 109. In some instances, the loss for each DNN may be calculated using other formulas than found in Formula 2. For example, the loss may be determined using Formula 2A:

$$\text{Loss}[i] = L(M_{D2-i}, M_{\sim D2-i}) \quad \text{Formula 2A:}$$

where L(X, Y) can be:
(1) L1 norm: L(X, Y)=sum(|x[j]−y[j]|);
(2) L2 norm: L(X, Y)=sqrt(sum((x[j]−y[j])*(x[j]−y[j])));
(3) Cross entropy loss: L(X, Y)=−sum(x[j]*log(y[j])). (In cross entropy loss, X and Y must have the elements between [0,1]), where T is an index, X=[x1, x2, . . . , xM], which may be considered the markings (i.e., "ground-truths", as described herein,) and Y=[y1, y2, . . . , yM], which represent the predictions or estimations of the DNNs. The foregoing examples are merely illustrative, and other loss formulas may be used.

The losses of each DNN may be aggregated, as shown in block 310. The aggregated losses may then be averaged to determine DNN_AVG_LOSS, as shown in block 311. In this regard, DNN_AVG_LOSS may be determined using Formula 3:

$$\text{DNN\_AVG\_LOSS} = \sum_{i=1}^{N} \frac{\text{Loss}_i}{N} = \sum_{i=1}^{N} \frac{(M_{D2-i} - M_{\sim D2-i})^2}{N} \quad \text{Formula 3}$$

where N is the total number of DNNs. As previously described, and as shown in FIGS. 3A and 3B the average loss may then be passed back to the ODTB 210 for use in conditioning the ODTB 210 before processing another piece of data in the data set 302, '$I_{D2+1}$'. In some instances, a weighted average could be applied to the loss of each DNN to account for the relative importance of each task performed by the DNNs. In this regard, the weighted averages may be used to balance the OTDB's translation of the data from one domain to another, with the performance of the DNNs processing the translated data.

Figure 4:
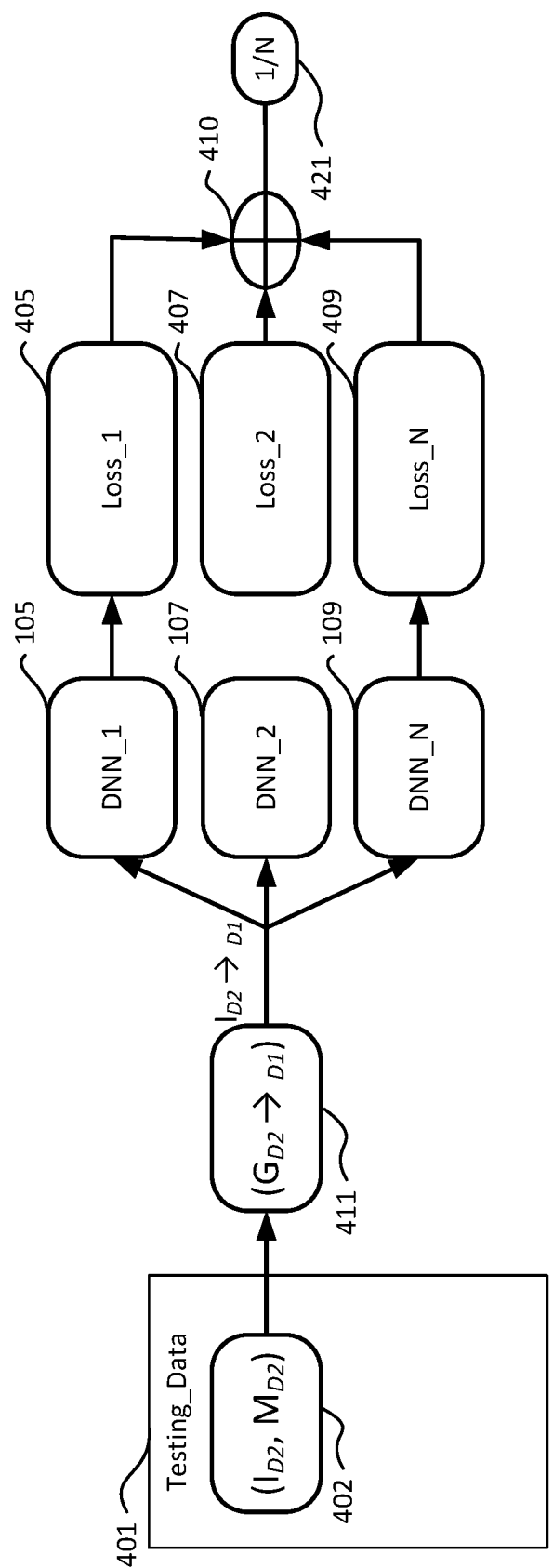
FIG. 4 is an example illustration of testing a generator model in accordance with aspects of the disclosure.

In the testing stage, the most accurate training model produced in the training stage may be selected. To determine the most accurate training model, the generator model ($G_{D2 \rightarrow D1}$) 411 may be tested at a certain frequency of a number of epochs. For instance, the generator model may be tested after being trained on 5, 10, 20, etc., pieces of data, as described with regard to the training stage herein. Each piece of data may correspond to one epoch. Referring to FIG. 4, the generator model ($G_{D2 \rightarrow D1}$) 411 may be tested with data from a testing dataset 401. In this regard, a piece of data from dataset 401 may be transformed from one domain to another by the generator model 411. The transformed data may then be processed by the DNNs 105-109 and the DNN_AVG_LOSS may be determined. The generator model 411 that provides the smallest DNN_AVG_LOSS may be kept as the generator model for use in processing additional data.

As shown in FIG. 4, the testing dataset 401 may include data ($I_{D2}$, $M_{D2}$) 402, where $I_{D2}$ represents a piece of data in the domain D2 and $M_{D2}$ represents markings for the piece of data $I_{D2}$ corresponding to the DNNs 105-109. The data ($I_{D2}$, $M_{D2}$) 402 in the testing dataset 401 may be different than the data ($I_{D2}$, $M_{D2}$) 302 in the training dataset 301 to provide a more accurate evaluation of the generator model 411.

As further shown in FIG. 4, the output of the generator model 411, which is the data $I_{D2}$ transformed from domain D2 to domain D1, labeled as $I_{D2 \rightarrow D1}$ in FIG. 4, may be passed to each DNN 105-109 for processing. The loss of each DNN may be determined, as shown in blocks 405-409. In this regard, the loss for each DNN may be aggregated, as shown in block 410 and the DNN_AVG_LOSS may be calculated as shown in block 421. The DNN_AVG_LOSS may be calculated using Formula 3, described herein. In the event the generator model 411 produced a DNN_AVG_LOSS less than a previously selected generator model, the generator model may be selected as the new generator model for processing additional data. The training and testing stages may continue until a certain number of epochs has been met, such as 10, 50, 100, 500, etc.

Figure 5:
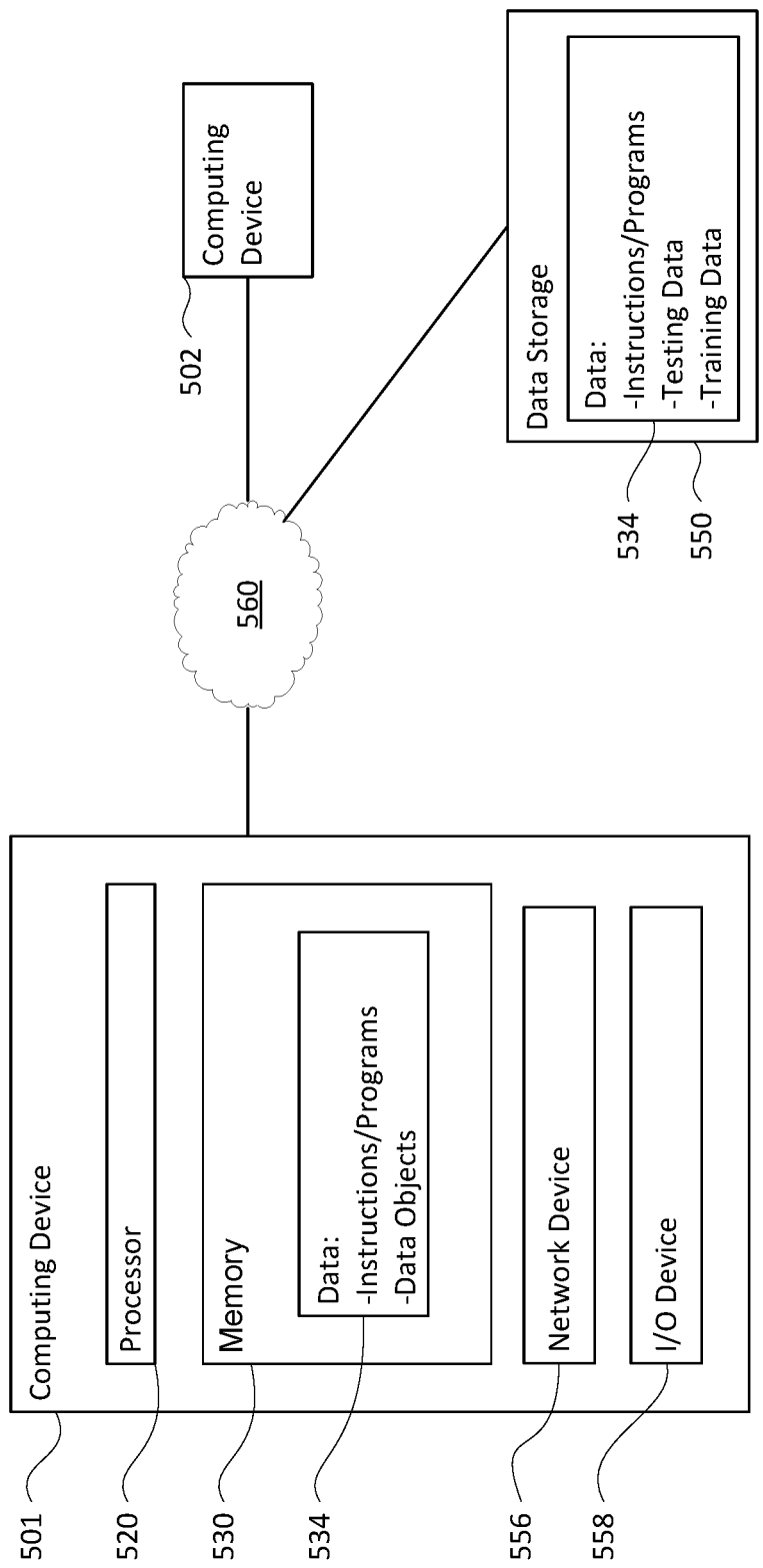
FIG. 5 is an example system in accordance with aspects of the disclosure.

FIG. 5 shows a block diagram of an example system 500. In some implementations, the system 500 may be utilized in implementing the training and testing stages described herein.

The system 500 includes a computing device 501 which includes one or more processors 520, memory 530, one or more network devices 556, and one or more I/O Devices 558, as further shown in FIG. 5. The processor 520 may be a commercially available central processing unit ("CPU"), a System on a Chip ("SOC"), an application specific integrated circuit ("ASIC"), a microprocessor, or other such hardware-based processors. In some instances, a computing device 501 may include multiple processor types.

Memory, such as memory 530, may be configured to read, write, and store data 534. Memory 530 may be any solid state or other such non-transitory type memory device. For example memory 530 may include one or more of a hard-drive, a solid state hard drive, NAND memory, flash memory, ROM, EEPROM, RAM, DVD, CD-ROM, write-capable, and read-only memories, or any other device capable of storing data. Data 534 may be retrieved, manipulated, and/or stored by the processor 520 in the memory 530.

Data 534 may include data objects and/or programs, or other such instructions, executable by the processor 520. Data objects may include data received from one or more components, such as other computing devices, such as computing device 502, the processor 520, I/O Device 558, network device 556, data storage 550, etc. The programs can be any computer or machine code capable of being executed by a processor, such as processor 520, such as locating and/or calibration programs described herein. The instructions can be stored in any format for processing by a processor or in any other computing device language including scripts or modules. The functions, methods, routines, etc., of the programs for training and testing an ODTB are explained in more detail herein. As used herein, the terms "instructions," "applications," "steps," "routines" and "programs" may be used interchangeably.

In some instances, the controller may be connected to or include one or more data storage devices, such as storage device 550. Data storage device 550 may be one or more of a hard-drive, a solid state hard drive, NAND memory, ROM, RAM, DVD, CD-ROM, write-capable, and read-only memories, or any other device capable of storing data. The data storage device 550 may store data 534, including programs and data objects. Although FIG. 5 illustrates only a single data storage device attached to a network 560, any number of data storage devices may be connected to the network and/or directly to the computing devices 501, 502.

Computing device 501 may include at least one network device. For instance, computing device 501 includes network device 556, which may be configured to communicatively couple computing device 501 with the other computing device 502 or other additional computing devices or storage devices, via the network 560. In this regard, the network device 556 may be configured to enable computing device communicate and receive data, such as training and testing data described herein, and other such signals to other computing devices or data storage 550. The network device 556 may include a network interface card (NIC), WiFi card, Bluetooth receiver/transmitter, or other such device capable of communicating data over a network via one or more communication protocols, such as point-to-point communication (e.g., direct communication between two devices), Ethernet, Wi-Fi, HTTP, Bluetooth, LTE, 3G, 4G, Edge, etc., and various combinations of the foregoing.

Computing device may include one or more I/O devices 558 for controlling the operation of the computing device. I/O devices 558 may include components normally used in connection with a computing device such as displays, input devices, such as touch screen, buttons and knobs, mouse, keyboard, microphone, etc.

The computing device 501 may exchange data 534 via an internal bus (not shown), a network device 556, or other such connection, between the memory 530, data storage device 550, processor 520, I/O device 558, or other such components. Although processor 520, memory 530, network device 556 and I/O device 558 are shown as being within the controller computing device 501, these components may be located externally from the computing device and in communication through one or more connections, such as through the network 560 or other connection interface.

Network 560 may include interconnected protocols and systems. The network 560 described herein can be implemented using various protocols and systems, such that the network can be part of the Internet, World Wide Web, specific intranets, wide area networks, or local networks. The network can utilize standard communications protocols, such as Ethernet, Wi-Fi and HTTP, proprietary protocols, and various combinations of the foregoing.

The other computing device, such as computing device 502, may include some or all of the components shown in computing device 501, including a processor, memory, network device, I/O device, and/or data storage. In some instances, other computing devices, such as computing device 502 may operate in cooperation with computing device 501 to form a distributed computing environment. In this regard, the computing devices in the distributed computing environment may work in coordination to split the processing needed to perform the training and testing stages described herein.

Figure 6A:
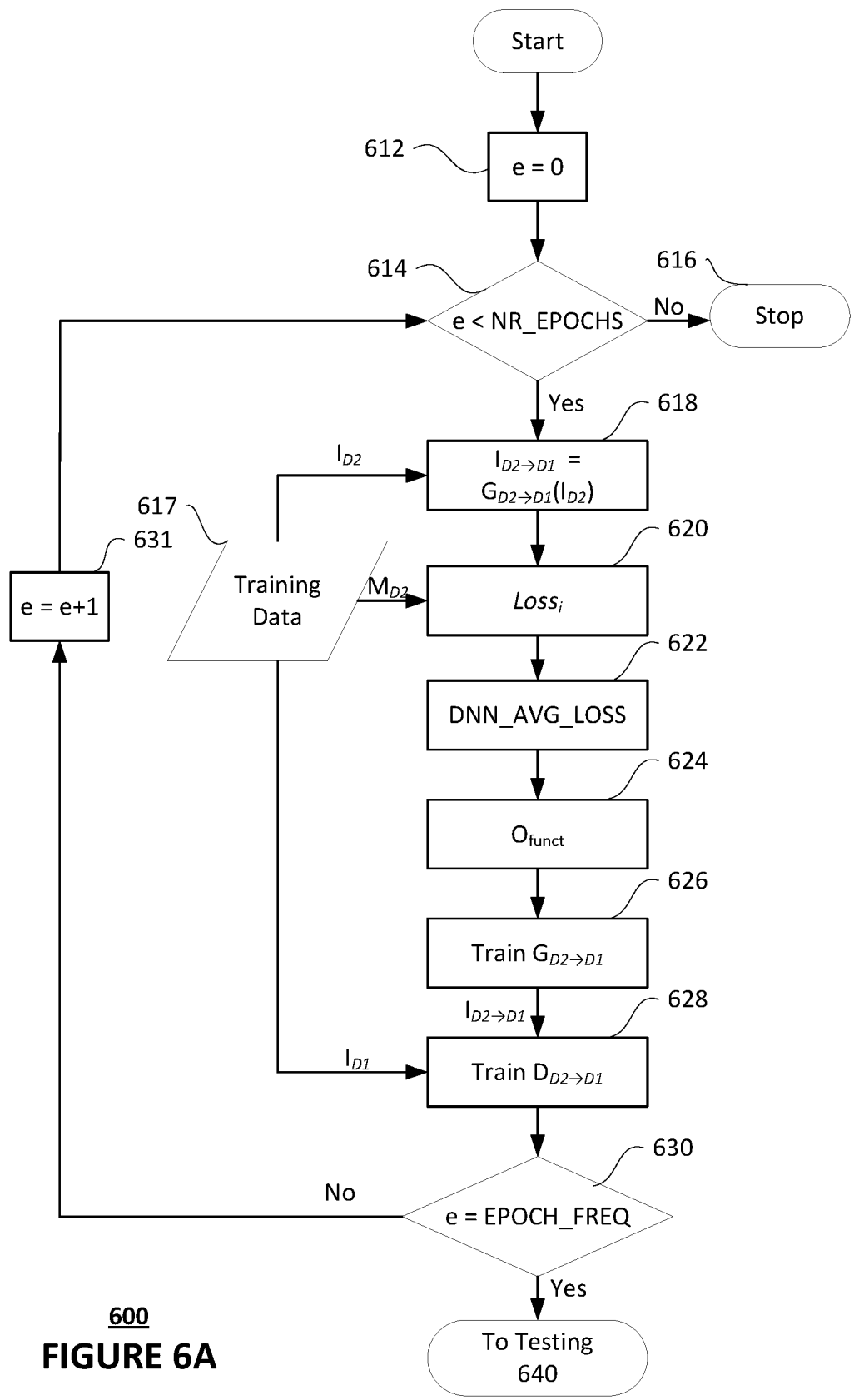
FIG. 6A is an example flow diagram illustrating a training stage in accordance with aspects of the disclosure.
Figure 6B:
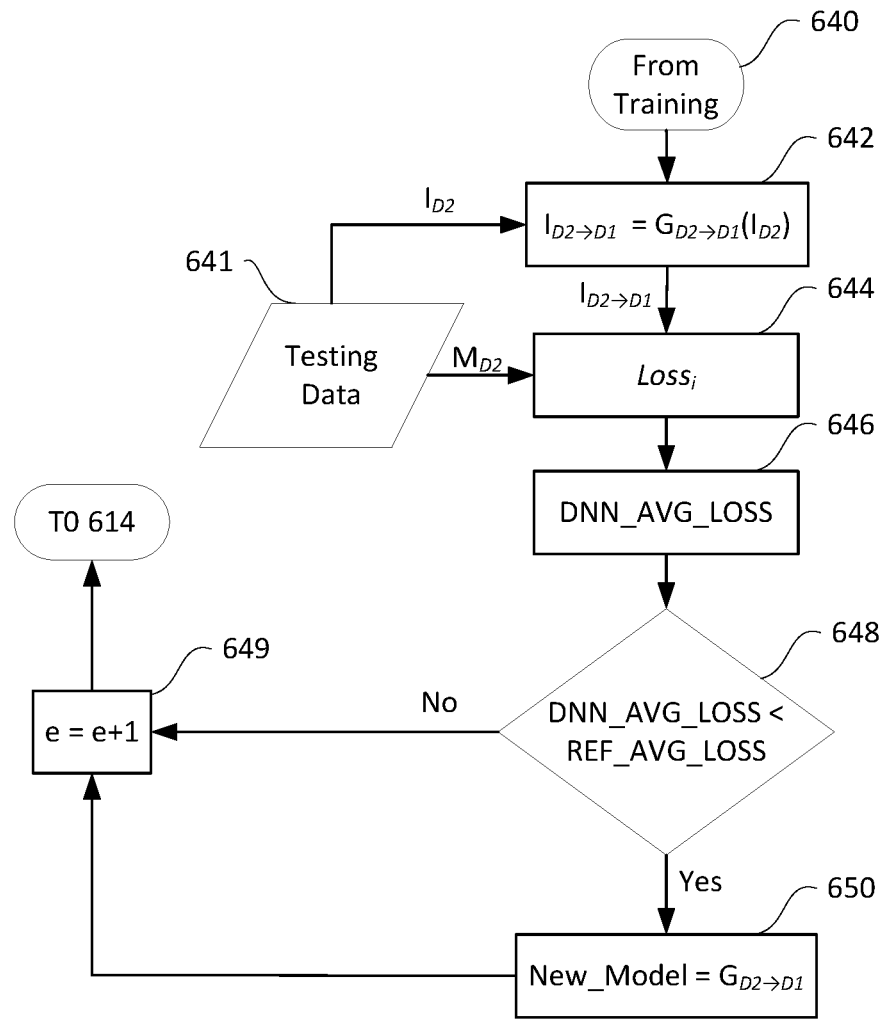
FIG. 6B is an example flow diagram illustrating a testing stage in accordance with aspects of the disclosure.

FIG. 6A illustrates a flow chart 600 showing the training stage of an ODTB, such as ODTB 210 using a computing device, such as computing device 501, and FIG. 6B illustrates a flow chart 601 showing the testing stage of the ODTB using the computing device. Referring to FIG. 6A, the number of epochs processed "e" is set to 0, as shown in block 612. The number of epochs is then compared to a preset number of training epochs "NR EPOCHS" for which the training stage should be performed, as shown in block 614. If the number of epochs processed matches or is greater than NR EPOCHS, the training may be stopped as shown in block 616. If the number of epochs is less than NR EPOCHS, the process may proceed.

As shown in block 618, the generator model 211, illustrated as ($G_{D2 \to D1}$) in FIG. 6A, may transform an image ($I_{D2}$). The image may be in domain D2 and transformed to an image in domain D1, illustrated as $I_{D2 \to D1}$ in FIG. 6A. Image $I_{D2}$ is provided by training data 617, which may be stored in the memory 530 of the computing device 501 or in a storage device, such as storage device 550. The loss of each DNN processing the transformed image, shown as $Loss_i$ in block 620, may be calculated using markings $M_{D2}$ provided by the training data 617 as described herein.

The loss for each DNN may be aggregated and the average loss (DNN_AVG_LOSS) may be calculated, as shown in block 622. The objective function, shown as $O_{funct}$, of the ODTB 210 may be updated based on the average loss, as shown in block 624. The generator model $G_{D2 \to D1}$ may then be trained using the updated objective function $O_{funct}$, as shown in block 626. The discriminator model 213, illustrated as $D_{D2 \to D1}$ in FIG. 6A, may then be trained to distinguish between real image ($I_{D1}$) and translated image ($I_{D2 \to D1}$) produced by the generator model $G_{D2 \to D1}$, as shown in block 628.

to satisfy the objective function $O_{funct}$ in conjunction with the generator model, with the assistance of an image $I_{D1}$ in domain D1, provided by the training data 617 and image $I_{D2 \to D1}$ produced by the generator model $G_{D2 \to D1}$, as shown in block 628.

After training the generator model $G_{D2 \to D1}$ and discriminator model as $D_{D2 \to D1}$ an epoch may be completed. In this regard, a determination may be made whether the number of epochs "e" equal to a preset epoch frequency "EPOCH_FREQ", as shown in block 630. The epoch frequency may be a certain multiple of epochs, such as every 10 epochs, every 50 epochs, etc. If e=EPOCH_FREQ, the process may move to a testing stage 640. Otherwise, the value of epochs may be increased by 1 as shown in block 631 and the training process may begin again, starting at block 614, as further shown in FIG. 6A.

Referring to flow diagram 601 of FIG. 6B, the testing stage may begin at block 640. In this regard, the generator model $G_{D2 \to D1}$ which was implemented on the latest epoch may be tested to determine whether the generator model $G_{D2 \rightarrow D1}$ should be marked as the preferred generator model for processing additional data, such as when used to process additional data, such as in a production environment. As shown in block 642, the generator model may be provided with an image $I_{D2}$ in domain D2, and may transform the image $I_{D2}$ to domain D1. The image $I_{D2}$ may be provided from testing data 641, which may be stored in memory 530 or provided by another device, such as data storage device 550. The image $I_{D2}$ provided by the testing data 641 may be different from the $I_{D2}$ in the training data 617.

The loss of each DNN processing the transformed image, illustrated as $I_{D2 \rightarrow D1}$ in FIG. 6B, may be calculated, as shown in block 644. The loss may be calculated using markings $M_{D2}$ provided by the testing data 641 as described herein. The loss for each DNN may be aggregated and the average loss (DNN_AVG_LOSS) may be calculated, as shown in block 646.

The average loss may be compared to a reference average loss (REF_AVG_LOSS), as shown in block 648. The reference average loss may correspond to the generator model that is currently preferred. If the average loss (DNN_AVG_LOSS) is less that the reference average loss (REF_AVG_LOSS), the current generator model $G_{D2 \rightarrow D1}$ may be selected as the new preferred generator model, as shown in block 650. In the event the average loss is greater than the reference average loss, or after updating the preferred generator model, the number of epochs "e" may be increased by 1, as shown in block 649, and the training and testing process may begin again at block 614 in FIG. 6B. In some instances, if the accuracy of the generator model does not satisfy a threshold value, after a certain number of epochs, the training and testing may be stopped.

A trained or otherwise optimized (ODTB) may be used to transform data from one domain into another domain corresponding to the domain the DNNs were trained to process. Accordingly, the DNNs may process data in multiple domains with similar consistency.

An example use case for an ODTB may include a driver monitoring system (DMS) system which monitors a driver's state during the operation of a vehicle. When the DMS detects the driver's state as being sleepy, inattentive, or otherwise not focused on the road, the DMS may provide an audible and/or visual alert, vibrate a seat, or take some other action to alert the driver of the potentially dangerous situation arising from the driver's state. In order to detect the state of the driver, DNN's may be trained to detect certain features of a driver, such as the driver's head pose estimation, gaze estimation, eyelid opening measurement, etc. Training of the DNNs may be done using data in a first domain including images of drivers faces captured by a 2 megapixel (MP) visible light camera. In this regard, images of drivers faces captured by a 2 MP visible light camera may be considered a first domain.

After training the DNNs, a trained model may be created. The trained model may be fed live or intermittent images of a driver of a vehicle captured by a 2 MP visible light camera in the driver's car. The outputs of the DNN's in the trained model may output as accurate results as possible given their respective level of training, as the images being analyzed by the trained model are also in the first domain. However, not all vehicles may include 2 MP visible light cameras, or due to cost cutting measures, a manufacturer may want a cheaper alternative, such as a camera having lower resolution. Images of drivers captured by the lower resolution camera may be considered a second domain. When these images in the second domain are analyzed by the trained model, the outputted results may be inaccurate.

To avoid needing to train a new model with DNNs capable of processing data in the second domain or simply being unable to make any change to the DNNs, a DTB may be optimized. As explained above, the DTB may be trained and optimized using training data in the second domain. The resulting ODTB may then be used to transform the images in the second domain to the first domain for processing by the trained model. In this regard, the ODTB may be fed live or intermittent images of a driver of a vehicle captured by the lower resolution camera and transform these images into the first domain for processing by the trained model. The DNN's of the trained model may then process the transformed images to detect certain features of a driver, such as the driver's head pose estimation, gaze estimation, eyelid opening measurement, etc., for use in the DMS.

Unless stated otherwise, the foregoing alternative examples are not mutually exclusive. They may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for tuning a data translation block (DTB) including a generator model and a discriminator model, the method including:
    receiving, by one or more processors, training data including an image in a second domain;
    transforming, by a generator model executing on the one or more processors, the image from the second domain to a transformed image in a first domain;
    processing, by one or more processors executing one or more deep neural networks (DNNs) trained to process data in the first domain, the transformed image to determine one or more outputs;
    updating, by the one or more processors, an original objective function for the DTB based on the one or more outputs; and
    training, by the one or more processors, the generator model and discriminator model to satisfy the updated objective function.

2. The method of claim 1, wherein each of the one or more DNNs outputs a respective output of the one or more outputs, and each respective output includes one or more predictions or estimated values.

3. The method of claim 2, wherein the training data further includes markings associated with the image in the second domain, the markings associated with the image in the second domain being separated into subsets, with each subset of markings being assigned to the one or more DNNs.

4. The method of claim 3, further including:

calculating a loss value for each of the one or more outputs.

5. The method of claim 4, wherein the loss value ($Loss_i$) is calculated for each DNN, using the formula:

$Loss_i = (M_{D2-i} - M_{\sim D2-i})^2$, where i is the DNN index, where $M_{D2-i}$ is the subset of markings assigned to DNNi and $M_{\sim D2-i}$ is the one or more predictions or estimated values output by DNNi.

6. The method of claim 5, further including:

weighting the loss value for each of the one or more DNNs;

aggregating the weighted loss value for each of the one or more DNNs; and determining an average loss value (DNN_AVG_LOSS).

7. The method of claim 6, wherein the updated objective function is:

$O_{CGAN} + \alpha_{DNN\_AVG\_LOSS} * DNN\_AVG\_LOSS$, where $O_{CGAN}$ is the original objective function of the DTB and $\alpha_{DNN\_AVG\_LOSS}$ is a weight factor.

8. The method of claim 1, wherein the training data further includes a training image in the first domain, and the discriminator is trained based on the transformed image and the training image.

9. A non-transitory computer-readable medium storing instructions, which when executed by one or more processors, cause the one or more processors to:

receive training data including an image in a second domain;

transform the image from the second domain to a transformed image in a first domain with a generator model;

process the transformed image to determine one or more outputs with one or more deep neural networks (DNNs) trained to process data in the first domain;

update an original objective function for a DTB based on the one or more outputs; and train the generator model and discriminator model to satisfy the updated objective function.

10. The non-transitory computer-readable medium of claim 9, wherein each of the one or more DNNs outputs a respective output of the one or more outputs, and each respective output includes one or more predictions or estimated values.

11. The non-transitory computer-readable medium of claim 9, wherein the training data further includes a training image in the first domain, and the discriminator is trained based on the transformed image and the training image.

12. The non-transitory computer-readable medium of claim 10, wherein the training data further includes markings associated with the image in the second domain, the markings associated with the image in the second domain being separated into subsets, with each subset of markings being assigned to the one or more DNNs.

13. The non-transitory computer-readable medium of claim 12, wherein the instructions further cause the one or more processors to calculate a loss value for each of the one or more outputs.

14. The non-transitory computer-readable medium of claim 13, wherein the loss value ($Loss_i$) is calculated for each DNN, using the formula:

$Loss_i = (M_{D2-i} - M_{\sim D2-i})^2$, where i is the DNN index, where $M_{D2-i}$ is the subset of markings assigned to DNNi and $M_{\sim D2-i}$ is the one or more predictions or estimated values output by DNNi.

15. The non-transitory computer-readable medium of claim 14, wherein the instructions further cause the one or more processors to:

weight the loss value for each of the one or more DNNs;

aggregate the weighted loss value for each of the one or more DNNs; and determine an average loss value (DNN_AVG_LOSS).

16. The non-transitory computer-readable medium of claim 15, wherein the updated objective function is:

$O_{CGAN} + \alpha_{DNN\_AVG\_LOSS} * DNN\_AVG\_LOSS$, where $O_{CGAN}$ is the original objective function of the DTB and $\alpha_{DNN\_AVG\_LOSS}$ is a weight factor.

17. A system for tuning a data translation block (DTB) including a generator model and a discriminator model, the system including:

one or more computing devices having one or more processors; and memory storing instructions, the instructions, when executed by the one or more processors, cause the one or more processors to:

receive training data including an image in a second domain;

transform the image from the second domain to a transformed image in a first domain with a generator model;

process the transformed image to determine one or more outputs with one or more deep neural networks (DNNs) trained to process data in the first domain;

update an original objective function for the DTB based on the one or more outputs; and train the generator model and discriminator model to satisfy the updated objective function.

18. The system of claim 17, wherein each of the one or more DNNs outputs a respective output of the one or more outputs, and each respective output includes one or more predictions or estimated values.

19. The system of claim 17, wherein the training data further includes a training image in the first domain, and the discriminator is trained based on the transformed image and the training image.

20. The system of claim 18, wherein the training data further includes markings associated with the image in the second domain, the markings associated with the image in the second domain being separated into subsets, with each subset of markings being assigned to the one or more DNNs.

21. The system of claim 20, wherein the instructions further cause the one or more processors to calculate a loss value for each of the one or more outputs.

22. The system of claim 21, wherein the loss value ($Loss_i$) is calculated for each DNN, using the formula:

$Loss_i = (M_{D2-i} - M_{\sim D2-i})^2$, where i is the DNN index, where $M_{D2-i}$ is the subset of markings assigned to DNNi and $M_{\sim D2-i}$ is the one or more predictions or estimated values output by DNNi.

23. The system of claim 22, wherein the instructions further cause the one or more processors to:
    weight the loss value for each of the one or more DNNs;
    aggregate the weighted loss value for each of the one or more DNNs; and
    determine an average loss value (DNN_AVG_LOSS).

24. The system of claim 23, wherein the updated objective function is:
    $O_{CGAN} + \alpha_{DNN\_AVG\_LOSS} * DNN\_AVG\_LOSS$, where $O_{CGAN}$ is the original objective function of the DTB and $\alpha_{DNN\_AVG\_LOSS}$ is a weight factor.

* * * * *